United States Patent
Kang

(10) Patent No.: US 7,155,406 B2
(45) Date of Patent: Dec. 26, 2006

(54) SCHEDULING METHOD FOR LOADING AND UNLOADING CONTAINERS AT THE TERMINAL AND A COMPUTER READABLE RECORDING MEDIUM RECORDED A COMPUTER PROGRAMMING OF THE SAME

(75) Inventor: Kyung Won Kang, Busan (KR)

(73) Assignee: Total Soft Bank, Ltd., Busan (KR)

( * ) Notice: Subject to any disclaimer, the term of this patent is extended or adjusted under 35 U.S.C. 154(b) by 856 days.

(21) Appl. No.: 10/086,348

(22) Filed: Mar. 4, 2002

(65) Prior Publication Data

US 2003/0167214 A1 Sep. 4, 2003

(51) Int. Cl.
*G06G 1/00* (2006.01)

(52) U.S. Cl. .................. 705/28; 705/29; 414/139.4

(58) Field of Classification Search .............. 705/28, 705/29; 414/139.4
See application file for complete search history.

(56) References Cited

U.S. PATENT DOCUMENTS

| | | | | |
|---|---|---|---|---|
| 3,669,288 A | * | 6/1972 | Young ................... | 414/803 |
| 3,952,891 A | * | 4/1976 | Terayama et al. .......... | 414/809 |
| 5,505,585 A | * | 4/1996 | Hubbard ................ | 414/803 |
| 5,712,789 A | * | 1/1998 | Radican ................ | 700/226 |
| 6,560,579 B1 | * | 5/2003 | Soga et al. ............. | 705/28 |
| 6,665,585 B1 | * | 12/2003 | Kawase ................ | 700/226 |
| 2002/0161675 A1 | * | 10/2002 | Kawase ................ | 705/29 |

FOREIGN PATENT DOCUMENTS

JP 2000223683 * 7/2000

OTHER PUBLICATIONS

MacDonald, Mitchell E., "How to keep things moving on the dock", Traffic Management, v32, n3, p10S(3), Mar. 1993.*

* cited by examiner

*Primary Examiner*—Michael Cuff
(74) *Attorney, Agent, or Firm*—G W i P S

(57) ABSTRACT

A scheduling method for loading and unloading the containers is developed and computerized for efficiently operating the loading and unloading cargo from the container ship to the assigned storage site or vice versa, and organizing the container storage system. A computer readable recording medium is also developed for recording the computer programs of the scheduling method for effectively performing the optimal loading and unloading process with the shortest time consuming. The recording medium contains a data acquiring step for establishing Yard Information Database, Container Database, Shipping Order Database, a Unloading Step including assigning an available quay location identifying unloading containers and assigning an available container storage site, Loading Step including identify the loading containers, location of storage site, cargo destination and ship quay location, and Data Storing Step for maintaining Bay Plan.

3 Claims, 12 Drawing Sheets

SCHEDULING METHOD FOR LOADING AND UNLOADING CONTAINERS AT THE TERMINAL AND A COMPUTER READABLE RECORDING MEDIUM RECORDED A COMPUTER PROGRAMMING OF THE SAME

BACKGROUND OF THE INVENTION

1. Field of the Invention

The present invention relates to a scheduling method for loading and unloading container cargo to and from the container ships at a terminal facility and a computer readable recording medium recorded its computer programs. More particularly, the scheduling method is computerized for effectively managing the container storage system and efficiently operating the loading and unloading the cargo. Furthermore, a computer readable recording medium being recorded a computer program of scheduling method is provided for conveniently manipulating the optimal loading and unloading process and shortening the operating time consuming.

2. Description of the Prior Art

A container terminal is a junction between the land and maritime transportations for smooth flow of international freights. The container terminal generally provides the facilities such as the loading and unloading equipments, transporting shuttle vehicles, container storage yard, warehouses and docking control systems for mooring the container ships beside the quay.

At present time, the container terminals adapt to use a partially computerized operating system. Most of the current operating systems are merely converted the manual operations to the partial computerizing operations based on the experience.

With regard to this matter, it is necessary to fully computerize the terminal operating systems for maximizing the productivity. Thus, many current container terminals and freight transportation related companies develop a File Layout System being capable to handle the information of massive freight transportation and flexible to the variation of freight quantity.

If a container liner has a navigating schedule to sail from Busan Korea, Tokyo Japan, Hong Kong to Philippine, the containers must be stacked sequentially on the liner to match the navigating schedule in order to avoid the unnecessary loading and unloading operations. For example, if the containers destined for Tokyo are stacked underneath the container destined for Hong Kong, an unnecessary loading and unloading operation is required. That is, the containers destined for Hong Kong must be unloaded before unloading the cargo destined for Tokyo Japan.

Therefore, it eventually saves the operation time and manpower, if the scheduling method of loading and unloading is fully computerized.

SUMMARY OF THE INVENTION

An objective of the present invention is to provide a scheduling method for loading and unloading containers at a terminal to and from the container ships by retrieving stored information of available quay space, container storage site or navigation schedule etc.

Other objective of the present invention is to provide a computer legible recording medium recorded its computer program for effectively performing the optimal loading and unloading process and shorten the operating time.

The purpose of computerizing the processes of loading and unloading is for effectively managing the container storage system and handling the massive amount of cargoes.

The scheduling system and scheduling computer program comprises as follows: (a) a data establishing step for setting the Yard Information Database by accumulating at least one of ship quay location data and container storage site data, (b) the Container Information Database includes at least one information of the containers being remained on the ship without loading or unloading, while a loading and unloading container Information Database is setting by inputting a container loading and unloading Information from outer source; (c) a step for setting up a shipping instruction Database according to the loading container contents information transmitted from the outer source; (d) when a ship entering port information is received by the outer source, the Yard Information Database is retrieved for assigning an available quay location. Then, check the unloading information and detailed unloading information for assigning an adjacent unloading site. This step is for unloading the containers at the assigned unloading sites; (e) when the loading information is received by the outer source, the Yard Information Database is retrieved for assigning an available loading site. Check out the containers and unload the containers at the assigned loading site. This step is for unloading the containers at the assigned loading site and maintaining the containers to load the corresponding ship. (f) a setting step for providing a Bay Plan which includes the information of ship quay location, shipping list and the loading and unloading information being provided based on the loaded and unloaded containers through the above (d) and (e) steps,

DETAILED DESCRIPTION OF THE PREFERRED EMBODIMENT

The present invention is aimed to develop a new concept of scheduling method for the optimal operation of loading and unloading container cargoes at the terminal and shortening operation time. This invention is also providing a computer readable recording medium being recorded a computer programming of the scheduling method to perform the loading and unloading operation.

Therefore, the scheduling method for loading and unloading containers at terminal of the present invention will discuss in detail accompanying with the drawings.

Figure 1:
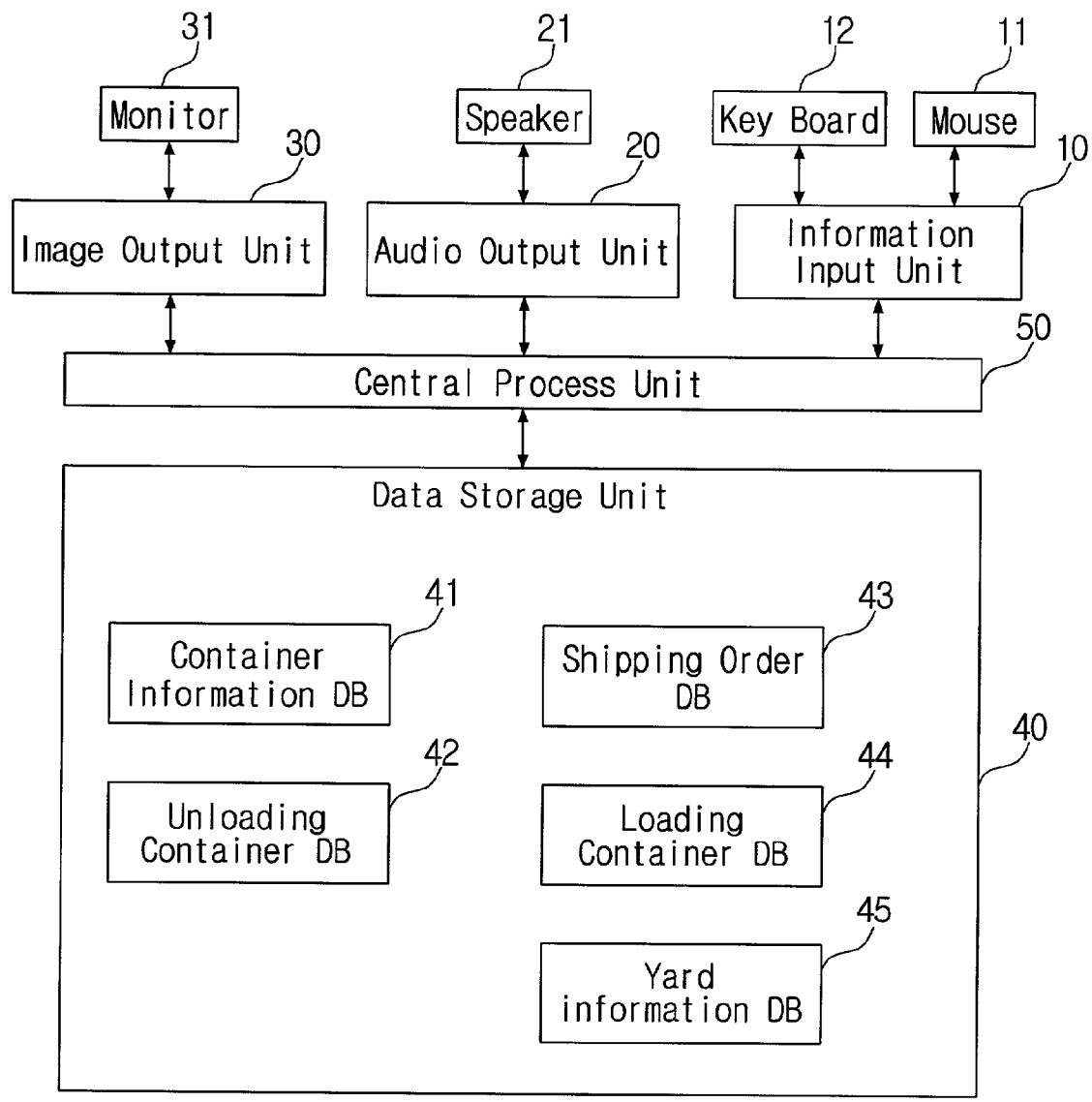
FIG. 1 is a block diagram illustrating a container loading and unloading scheduling system of the present invention.

FIG. 1 is a block diagram illustrating a container loading and unloading scheduling system. As illustrated in the diagram, a scheduling system for loading or unloading the containers includes as follows: an Information Input Unit (10) for setting input data to proceed the loading or unloading operation, Audio Output Unit (20) for outputting an audio information, Image Output Unit (30) for displaying an image output, Data Storage Unit (40) for storing and maintaining the received information or data and Central Processing Unit (50) for executing the received information from the Information Input Unit (10).

The Central Processing Unit (50) is connected to the Information Input Unit (10), Audio Output Unit (20), Image Output Unit (30) and Data Storage Unit (40) for communicating and processing the information each other.

The Data Storage Unit (40) comprises a Container Information Database (41) for inputting and storing at least one information of remained containers on board (ROB), loaded containers or unloaded containers, an Unloading Container Database (42) and Loading Container Database (44) for storing and maintaining information of unloading container or loading container, a Shipping Instruction Database (43) for instructing and storing a container content information, a container destination and a Yard Information Database (45).

The system for scheduling the loading and unloading containers at the terminal includes a computer (100) being loaded at least one of computer programs such as a CATOS program, CASP program or other kind of similar program. Through the computer (100), the scheduling system is also able to provide a loading or unloading schedule based on the Shipping Instruction and other data retrieved from the Data Storage Unit (40). A Bay Plan is setting up through provision of loading or unloading schedule. The Central Processing Unit (50) controls and manages each unit for executing the loading and unloading programs.

The Bay Plan File Layout specifies the inclusion of information items appeared in the BAPLIE (standard document) for transmitting to a third party (partner who exchanges files each other) which does not use the Computer Automated Container Terminal Operation System (CATOS) and the Computer Automated Stowage Planning (CASP) without losing the data.

The Bay Plan provides information of specific position of the cargo ship. The lengthwise of ship is divided into a plurality of sections or cells by zoning and numbering. It is used as a basic loading diagram to assign a proper zone for the various cargoes and schedule the sequence work list. The container liner will load cargos according to the information of each container such as: each container identification number, size, name of shipping company, place of loading and unloading, weight, special container contained hazardous material, and refrigerating container.

Figure 10:
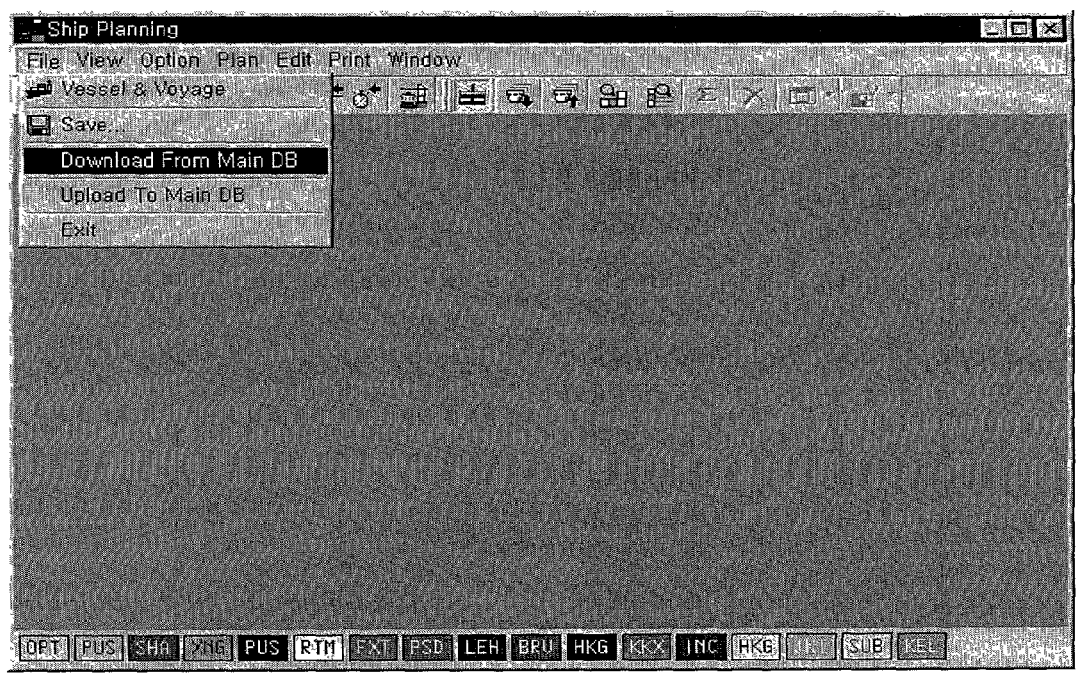
FIG. 10 is a diagram showing a menu screen being able to download the Main Database.
Figure 11:
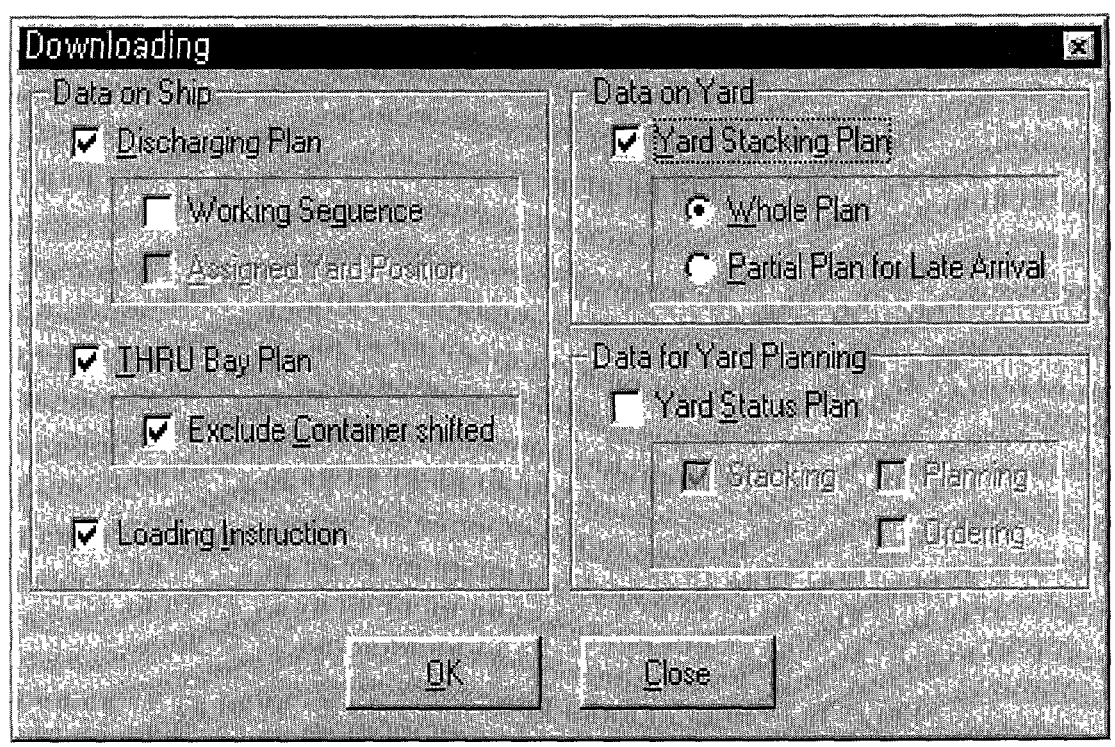
FIG. 11 is a diagram that enables to set a certain mode of program via the download.

The Loading Instruction informs the specific loading zone or section of the ship depending on the container content, amount or number of containers, type of containers and port of discharging (POD). The container loading and unloading scheduling system at the terminal is downloaded through the screen as illustrating in FIG. 10. After downloading the Bay Plan or certain programs from the shipping company, a desired file (for example, an expander such as a .rob, .inv, .prf.) is able to set up as shown in FIG. 11 through the exemplary diagram.

The computer (100) can be used a personal computer such as a desktop or laptop computer having a web-browser which is capable to display web site. It is desirable that the computer must be equipped at least Windows 98 or above version of operating system, Pentium level or faster CPU, and more than 64 MB of memory.

Even though a personal computer is used as the computer (100) of the present invention illustrated in the implementation example, it is not limited to apply a personal computer.

An information input system comprising an information input unit (10), mouse (11) and keyboard (12) being enables to store and retrieve the container information (for example, loading and unloading information) for selectively using the available information by an operator.

An audio output system comprising an audio output unit (20) and speaker (21) enables to generate a voice or sound output signal based on the transmitted signals from the CPU (100). An image output system comprising an image output unit (30) capable to generate the image signals by converting the output signals received from CPU (50) and a monitor (31) for displaying the image signals on the screen.

The Data Storage Unit (40) comprises a Yard Information Database (45) established at least one of ship quay location information or container storage site information, an Unloading Container Database (42) and Loading Container Database (44) for inputting and maintaining information of unloading container or loading container, a Container Information Database (41) for inputting and storing at least one information of remained containers on board (ROB), loaded containers or unloaded containers, a Shipping Instruction Database (43) for instructing and storing the information of container content and destination.

The Data Storage Unit (40) is also contained tidal information, detailed information of the ship, lane (navigation schedule) information and hazardous cargo code classified by hazardous material.

The loading and unloading schedule is desirably performed based on the loading and unloading information through the Bay Plan being transmitted from the shipping company.

The Central Processing Unit (50) should have a sufficient capacity to handle the large amount of container loading and unloading information for retrieving, searching and exchanging information. The CPU could be either one of P54C of Intel (32 bit, 100 MHz), Power PC604 of Motorola (32 bit, 120 MHz), or Ultra SPARC-1 of Micro system (32 bit, 166 MHz).

The Data Storage Unit (40) includes a Container Information Database (41), an Unloading Container Database (42), a Shipping Instruction (43), a Loading Container Database (44), a Yard Information Database (45) and a hazardous cargo cord Database. As an example, software developed by "Oracles" is used for producing and managing such Databases.

On the other hand, the container information stored in the Container Information Database (41) is the information of remaining containers on board without loading or unloading. It also includes a container identification number remained on the ship, distinction for loading and unloading, Ship Cell Position, gateway, initial departing port code, loading port cod, unloading port code, optional unloading port code, final unloading port code, final cargo destination code, and unloading port code before change.

The loading and unloading information stored in the loading container database (44) and unloading container database (41) includes the container identification numbers for loading and unloading, container conditions, rehadle code, Ship Cell Position, yard position, zone or section, initial departing port code, loading port code, unloading port code, optional unloading port code, final unloading port code, cargo final destination code, unloading port code before changing the destination, gateway, shifting time, shifting type, shifting reason, port of shifting, shifting account, size type operator, weight, full/empty, type of cargo delivery, cargo type codes, Temperature, IMDG, unno, BL-NO, Second Vessel Code, voyage year of Second Vessel and voyage difference of Second Vessel.

The Yard Information Database (45) is related to the ship quay location information (if there are enough quay available at a terminal, this information shows the size and number of available quay space at terminal for mooring the different size of ships) and the container storage site information.

The container storage site information includes information of storing places where the containers can be stocked, and indicates available cells in a block and stored styles at a specific block (the smallest storage site unit).

More specifically, the storage site information informs the available blocks for assigning the specific sorts of containers. For example, the imported, exporting, refrigerating or hazardous material containers are stocked at the available blocks of imported, exporting, refrigerating or hazardous material storage site, respectively.

The tidal information informs the sea level information that affects the working height of stocked containers on the ship. If the containers are over stocked on the ship closed to the cargo lifting equipment, it will touch the cargo lifting equipment when the sea level is raised at the high tide. It is desirable to make a timetable for tidal information on the hourly basis.

Because the tidal timetable informs the sea level variations, it is possible to assign the priority of loading and unloading operations depending on the zone of the ship, i.e., operation of loading and unloading starts from the upper zone of the ship first before high tide begins.

The vessel detail information being downloaded from shipping company informs the actual Cell layout of the ship including the information of loading capacity, size and types of containers. For example, a ship detail information provides the loading instructions that the refrigerating containers must be loaded at the proper zone where the power source or electric outlet is provided, the hazardous material containers must not be loaded at the bottom of the ship, and the Hi Cubic (over size of height) containers must not be loaded at the restricted cells.

The navigation schedule or lane information provides the detailed sailing schedule of a liner for planning the operation of loading and unloading the destined containers at a stop by port. For example, a container liner navigates from Busan, Korea→Tokyo, Japan→Hong Kong→Philippines, the container cargoes destined for Tokyo, Japan must be stacked underneath the container destined for Hong Kong, to avoid the unnecessary loading and unloading operations at the stop by port.

As illustrated in Table 1, 2 and 3, the container information stored in the Container Information Database (41) provides information of stored container locations, indication of loading and unloading the container at the storage site and on board.

The container information provides that: container identification number for remaining on board, shipping company code, initial loading port code, loading port code, unloading port code, optional unloading port code, final unloading port code, container specification, container weight, indicating mark of empty container, cargo delivery mode, cargo sort code, temperature of the refrigerating container, hazardous material container code, transferring ship code; if cargo will be transferred to the other ship; navigation gap if cargo will be transferred to the other ship; if the container is not in standard dimension, excessive height, front length, left length, right length; for the cargo without container, occupied upper space, occupied left and right space; cautions related to containerized cargo, content reference number; initial unloading port code before changing the destined port; initial cargo location before transferring the containers, changed port code where the container transfers, reasoning code for transferring container, shipping company code that owes transferring expenses if container transfers, specified condition code at the time of loading, container door location at time of loading, status of opening/closing container doors at the time of loading, assigned Gantry Crane number at the terminal, sequence order of loading and unloading containers at the terminal, block numbers where the containers are stocked or to be stocked, Bay number, Row number, Tier number, type of hazardous, the status of tariff clearance, the status of work performance, adjacent terminal code or port code from the terminal for loading containers, adjacent terminal code or port code from the terminal for unloading containers, location code for initially received cargo and number of transferring container.

TABLE 1

| No | Field Name | Start | Length | Field Description |
|---|---|---|---|---|
| 1 | Container Number | 1 | 12 | {ABCD1234567}, Container Identification Number |
| 2 | IX Code | 13 | 1 | "I" = Inbound, "X" = Outbound Inbound or Outbound container identifying Code |
| 3 | State | 14 | 1 | "R" = Reserved, "B" = Booking, "O" = Chassis, "Y" = Yard, "D" = Delivery, "G" = Gate, "P" = P/U Order, Code for indicating the status of Containers. |
| 4 | Cancel | 15 | 1 | "Y" = Cancel, "N" = No Cancel. Status of canceling or not for loading containers. |
| 5 | Pre-information | 16 | 1 | "Y" = Cancel, "N" = No cancel. Check the loading status for the containers not received |
| 6 | Direct | 17 | 1 | "Y" = direct receipt, "N" = Yard Storage. Status of direct receipt. |
| 7 | Cntr Reserved | 18 | 3 | Available space. |
| 8 | Inbound Bay | 21 | 3 | Loading location on board for inbound containers. (Bay Number) |
| 9 | Inbound Row | 24 | 2 | Loading location on board for inbound containers. (Row number) |
| 10 | Inbound Tier | 26 | 2 | Loading location on board for inbound containers. (Tier number) |
| 11 | Outbound Bay | 28 | 3 | Loading location on board for outbound containers. (Bay number) |

TABLE 1-continued

| No | Field Name | Start | Length | Field Description |
|---|---|---|---|---|
| 12 | Outbound Row | 31 | 2 | Loading location on board for outbound containers. (Row number) |
| 13 | Outbound Tier | 33 | 2 | Loading location on board for outbound containers. (Tier number) |
| 14 | Inbound YBlock | 35 | 5 | Terminal block number where inbound containers are stored or to be stored. |
| 15 | Inbound YBay | 40 | 3 | Terminal Bay number where inbound containers are stored or to be stored. |
| 16 | Inbound YRow | 43 | 3 | Terminal Row number where inbound containers are stored or to be stored. |
| 17 | Inbound YTier | 46 | 1 | Terminal Tier number where inbound containers are stored or to be stored. |
| 18 | Inbound YArea | 47 | 5 | Terminal area name where inbound containers are stored or to be stored. |
| 19 | Outbound YBlock | 52 | 5 | Terminal block number where outbound containers are stored or to be stored. |
| 20 | Outbound YBay | 57 | 3 | Terminal Bay number where outbound containers are stored or to be stored. |

TABLE 2

| No | Field Name | Start | Length | Field Description |
|---|---|---|---|---|
| 21 | Outbound YRow | 60 | 3 | Terminal Row number where outbound containers are stored or to be stored |
| 22 | Outbound YTier | 63 | 1 | Terminal Tier number where outbound containers are stored or to be stored. |
| 23 | Outbound YArea | 64 | 5 | Terminal area name where outbound containers are stored or to be stored. |
| 24 | Inbound QC | 69 | 2 | QC of Inbound work |
| 25 | Inbound SEQ | 71 | 4 | Sequence of inbound work |
| 26 | Inbound Twin | 75 | 1 | Work existence status of Inbound twin lift |
| 27 | Inbound Dual | 76 | 1 | Work existence status of inbound dual cycle |
| 28 | Inbound Done | 77 | 1 | Status of inbound work completion. |
| 29 | Inbound Reserved | 78 | 3 | Available space |
| 30 | Outbound QC | 81 | 2 | QC of outbound work. |
| 31 | Outbound SEQ | 83 | 4 | Sequence of outbound work. |
| 32 | Outbound Twin | 87 | 1 | Work existence status of outbound twin lift |
| 33 | Outbound dual | 88 | 1 | Work existence status of outbound dual cycle. |
| 34 | Outbound Done | 89 | 1 | Status of outbound work completion. |
| 35 | Outbound Reserved | 90 | 6 | Available space. |
| 36 | Gateway | 96 | 5 | Assigned gate number within the port. |
| 37 | Port of Origin | 101 | 5 | Initial loading port code |
| 38 | Port of Loading | 106 | 5 | Code for port of loading |
| 39 | Port of Discharging | 111 | 5 | Code for port of unloading |
| 40 | 2nd POD (Optional Port) | 116 | 5 | Code of optional port of unloading. (If unloading port is not confirmed, both port of unloading and optional port will be treated as optional port.) |

TABLE 2-continued

| No | Field Name | Start | Length | Field Description |
|---|---|---|---|---|
| 41 | Final POD | 121 | 5 | Code of final port of discharging. |
| 42 | Final Destination | 126 | 5 | Code of final destination |
| 43 | Change of Destination | 131 | 5 | Unloading port code before changing port of unloading information |
| 44 | Shifting time | 136 | 1 | "1" = Shifting on board "2" = shifted twice from ship to yard vice versa Shows the type of shifting. |
| 45 | Shifting type | 137 | 1 | "O" = On Chassis, "Y" = Yard, "Q" = Quay Side. The storage type of two time shifting |
| 46 | Shifting Reason | 138 | 1 | Code for container shifting reason. |
| 47 | Port of Shifting | 139 | 5 | Code for port of shifting |
| 48 | Shifting Account | 144 | 5 | Shipping company owes the expense of shifting |
| 49 | Shifting Reserved | 149 | 2 | Available space. |
| 50 | Size Type | 151 | 4 | Container Specification (ISO:6346), system supporting specifications. |
| 51 | SizeType2 | 155 | 4 | Container Specification (User defined.) |
| 52 | Operator | 159 | 5 | Codes of shipping company. |
| 53 | Weight | 164 | 5 | Container Weight (No decimal point) |

TABLE 3

| No | Field Name | Start | Length | Field Description |
|---|---|---|---|---|
| 54 | Full/Empty | 169 | 1 | "F" Full, "E" =Empty. Indicating mark whether container is full or empty. |
| 55 | Delivery | 170 | 1 | Mode of cargo delivery. |
| 56 | Special Label | 171 | 2 | Code indicating types of cargo |
| 57 | Door Status | 173 | 1 | "O" = Open, "C" = Closed. Status of container door at time of loading. |
| 58 | Flip Direction | 174 | 1 | "A" = Afterward, "F" Forward. Location of container door at time of loading "A" means door faces rearward, "F" means forward. |
| 59 | Wheeled/Decking | 175 | 1 | Indicates whether containers are stored at yard or on the wheel. |
| 60 | Group Code | 176 | 1 | Group code for specific content (ex) Group code 3(=IMDG 3.1) |
| 61 | Custom Hold | 177 | 1 | "Y" indicates the status of tariff |
| 62 | Cargo Reserved | 178 | 13 | Available space. |
| 63 | Over Dimension Height | 191 | 3 | Exceeding height if cargo is not in container. (Unit CM) |
| 64 | Over dimension Forward | 194 | 3 | Exceeding front length if cargo is not in container (Unit CM) |
| 65 | Over dimension Afterward | 197 | 3 | Exceeding rear length if cargo is not in container (Unit CM) |
| 66 | Over Dimension Port Side | 200 | 3 | Exceeding left length if cargo is not in container. (Unit CM) |
| 67 | Over Dimension Starboard Side | 203 | 3 | Exceeding right length if cargo is not in container. (Unit CM) |
| 68 | Over Slot Height | 206 | 1 | Occupied upper space if cargo is not in container (container loading space unit) |
| 69 | Over Slot Port Side | 207 | 1 | Occupied left space if cargo is not in container (container loading space unit) |

TABLE 3-continued

| No | Field Name | Start | Length | Field Description |
|---|---|---|---|---|
| 70 | Over Slot Starboard Side | 208 | 1 | Occupied Right space if cargo is not in container (container loading space unit) |
| 71 | Over Dimension Reserved | 209 | 2 | Available space. |
| 72 | Handling Instruction | 211 | 10 | Code for cargo handling instruction. |
| 73 | Temperature | 221 | 10 | Temperature of refrigerating container (No decimal point.) |
| 74 | IMDC | 231 | 10 | IMDG Code for hazardous cargo |
| 75 | UNNO | 241 | 20 | UNNO Code for hazardous cargo. |
| 76 | VVD | 261 | 20 | Navigation gap between original vessel and 2nd (previous) vessel if containers transferred |
| 77 | BL Number | 281 | 30 | Bill of Lading number |
| 78 | Reserved | 311 | 38 | Available space |
| 79 | CRLF | 349 | 2 | Line divider |
|  | Total | 350 |  |  |

The container loading and unloading schedule system at terminal enables to store and maintain the loading information in the Loading Container Database (44). The loaded location of specific containers is memorized and marked with specific color (for example, white color) in the container loading and unloading Database. Therefore, the loading operation is able to perform based on the Bay plan transmitted from the shipping company or loading information input from the administrator.

In addition, the container loading and unloading scheduling system at terminal enables to store and maintain the unloading information in the Unloaded Container Database (42). The unloading location of specific containers will be assigned and marked with specific color (for example, red color) in the container loading and unloading Database. Then, the unloading operation is able to perform based on the Bay plan transmitted from the shipping company or unloading information input from the administrator.

When the Bay plan is transmitted from the shipping company or loading and unloading information input from the administrator, the container loading scheduling system is also able to furnish an updated Bay Plan for loading or unloading schedule based on the received loading and unloading information. Then, the information could be transmitted to the next shipping company via Electronic Data Interchange (EDI).

On the other hand, the Central Processing Unit (50) controls the programs as follows: once an unloading document contained unloading plan, bay plan and lists of containers sorted by transportation is received from an administrator, the CPU processes to assign a Gantry crane based on the overall volume of containers. Then the administrator is able to selectively assign the several available Gantry cranes for each zone of the ship and operating time.

The Central Processing Unit (50) composes a list of assignment for unloading and sequence work order to each gantry crane according to the information received from the administrator and the numbers of Gantry cranes. It is also possible to modify the amount of unloading due to variation of cargo quantity, or navigation schedules.

The Central Processing Unit (50) is also able to execute unloading work schedule by controlling each program once various information is provided by the administrator such as the loading plan, list of container numbers to be loaded, list of ship transfer number, yard storage diagram, weight distribution diagram of containers to be loaded and list of empty containers.

Same as unloading schedule, the Central Processing Unit (50) is also generates a list of sequence loading order and loading bay plan by using loading work schedule for a specific gantry crane.

Further detailed description of the present invention, with reference to FIG. 2 and FIG. 12, the container loading and unloading schedule at terminal is provided as follows:

The container loading and unloading schedule system at the terminal includes Container Information Database (41), Unloaded Container Database (42), Shipping Instruction Database (43), Loaded Container Database and Yard Information Database (45). By using the Yard Information Database (45), the System also assigns optimal loading and unloading storage site based on proper vessel location information for loading and unloading, and cargo storage site information. Once a report of unloading and loading instructions is received after the completion of loading and unloading, the System stores and manages loaded and unloaded container information in the Unloaded Container Database (42) and Loaded Container Database (44). Thereafter, the scheduling System furnishes bay plan, which has been generated based on the location and list of the loaded cargoes, to the next shipping company.

Figure 2:
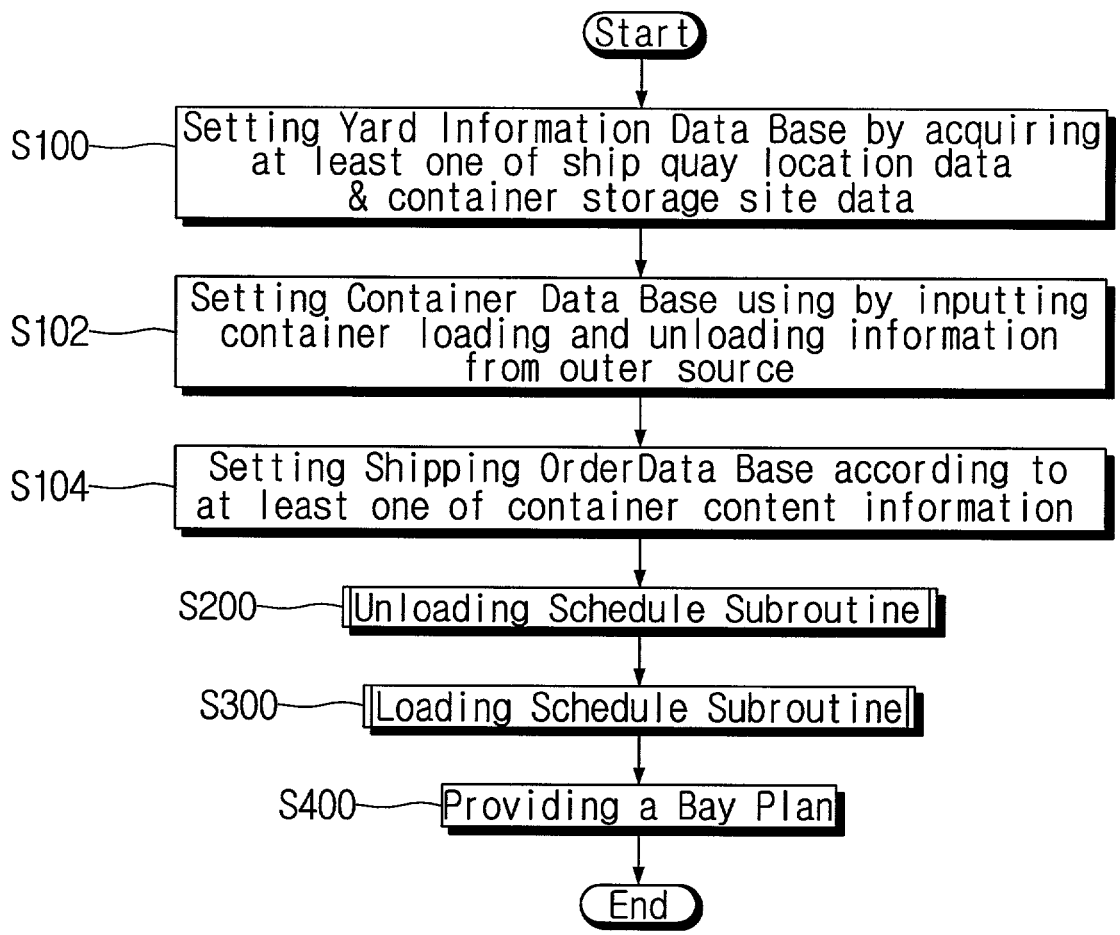
FIG. 2 is a flow chat illustrating a scheduling method for loading and unloading the containers at terminal of the present invention.

Now, the container loading and unloading schedule system is explained in reference to FIG. 2. The Central Processing Unit (50) processes to setup a state (S100) of the Yard information database (45) by using at least one of the ship quay information or container storage site information.

The Central Processing Unit (50) processes to setup a state (S102) of the container Information Database (41) by using at least one of remained cargoes on board (ROB) while the Unloading Container Database (42) and Loading Container Database (44) to setup by using unloading loading information based on the Bay plan transmitted from the shipping company or loading information input from the administrator.

The loading and unloading container information includes as follows: the container identification number for loading and unloading, container condition, rehadle code, Ship Cell Position, yard position, zone (region), initial departing port code, loading port code, unloading port code, optional unloading port code, final unloading port code, cargo final destination code, unloading port code before changing the destination, gateway, shifting time, shifting type, shifting reason, port of shifting, shifting account, size type operator, weight, full/empty, type of cargo delivery, cargo type codes, Temperature, IMDG, unno, BL-NO, Second Vessel Code, voyage year of Second Vessel and voyage difference of Second Vessel.

The container information includes: the container identification number remained onboard, distinction of loading and unloading, Ship Cell Position, gateway initial departing port code, loading port code, unloading port code, optional unloading port code, final unloading port code, cargo final destination code, unloading port code before changing the destination.

The CPU (50) processes to setup a state (S104) of shipping instruction database (43) using container content information. The container content information includes as follows: container ID number, status of the container (whether the container is stocked in the storage site, or already loaded onboard or not yet received in the terminal.), content of ship cell position once loaded on board, regional content information (In case of direct loading at receiving, yard position is not available.), codes of loading port, codes of unloading port, size type, operator, weight, full/empty status, sort of cargo (content temperature of refrigerating cargo, hazardous code (IMDG) for hazardous materials cargo).

For the present implementing example, it is desirable to perform the loading and unloading schedule according to the shipping instruction or bay plan, being transmitted from the shipping company via EDI. However, it is possible that the loading and unloading schedule could be performed according to the loading and unloading information provided by the administrator.

When a Bay plan is transmitted from the shipping company and a vessel entering port information is received from the administrator, the CPU (50) starts to scan the Yard Information Database (45) for assigning an available quay space. Then, the unloading process of subroutine (S200) executes to search and assign an available storage site for unloading cargoes.

Figure 3:
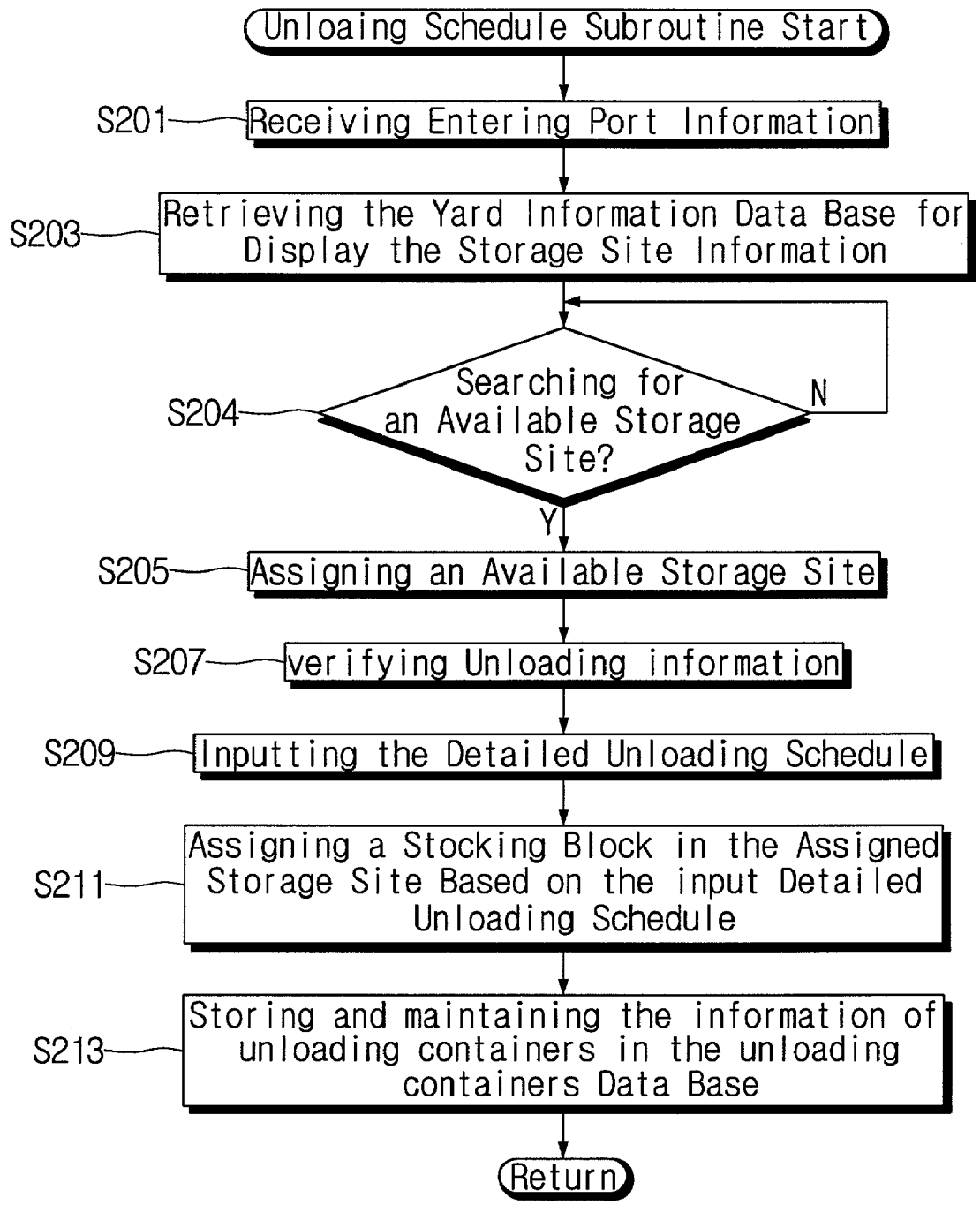
FIG. 3 is a sub-routine illustrating a detailed unloading schedule.
Figure 13:
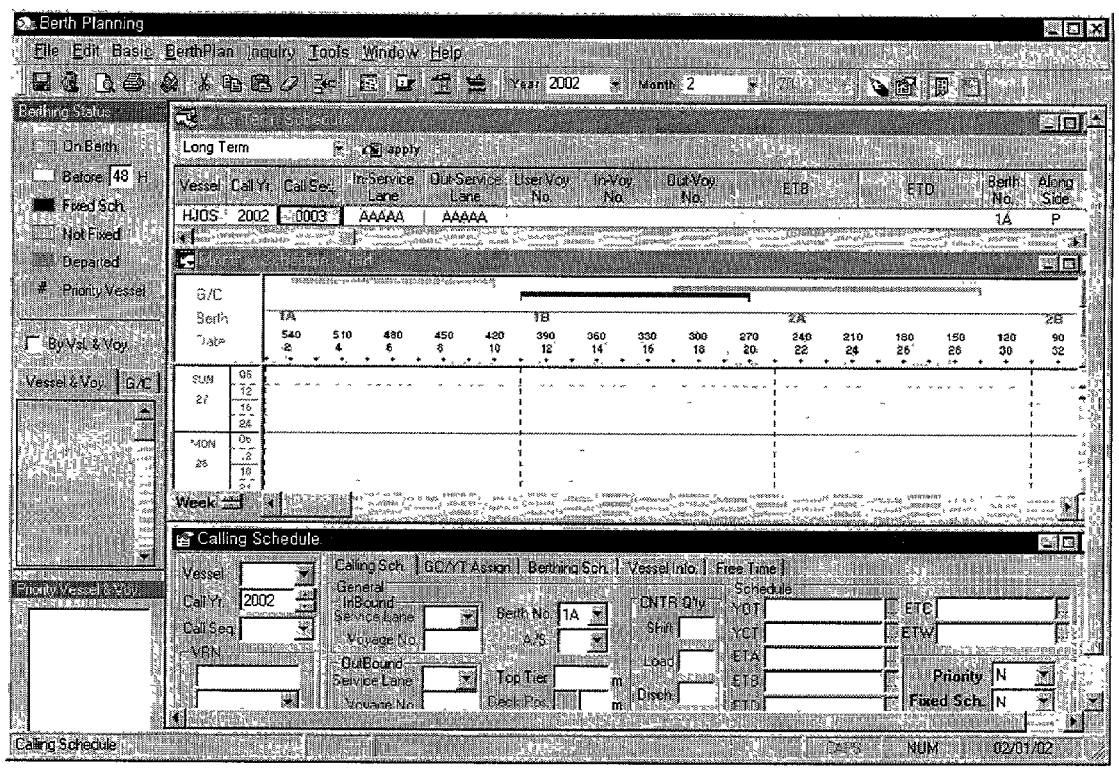
FIG. 13 is a diagram illustrating a detailed menu of Berth planning mode.

The unloading plan subroutine (S200) is further discussed with reference to FIG. 3. The CPU (50) receives the vessel entering port (S201) information via the screen as illustrated in FIG. 13. The vessel entering port information basically informs that: a cargo liner entering the port has a certain size, length and loaded a certain amount of freights for unloading. The CPU (50) processes the image output unit (30) to display the yard information Database (45) on a screen of monitor (31) for searching how many quays are available and occupied (S203). The CPU (50) also processes the Information Input Database (10) to display how many storage sites are available, for assigning a container storage site (S204).

As a result of searching the Information Input Database (S204), the liner is able to assign a container storage site, if there are available storage site exist. If there are no available container storage site left in the Information Input Database (10), the system will maintain "on standby" status for the ship.

The Central Processing Unit (50) processes the Image Output Unit (30) for displaying the unloading information on the screen of display monitor (31). Then, the administrator is able to verify the unloading instruction (S207) (Refer FIG. 5) for unloading cargoes. Prior to the ship entering the port, the bay plan and shipping instruction are transmitted through EDI to instruct the operator or administrator where the specific cargoes are located or how the specific cargoes are stocked, and what and how many cargos are unloaded.

Figure 5:
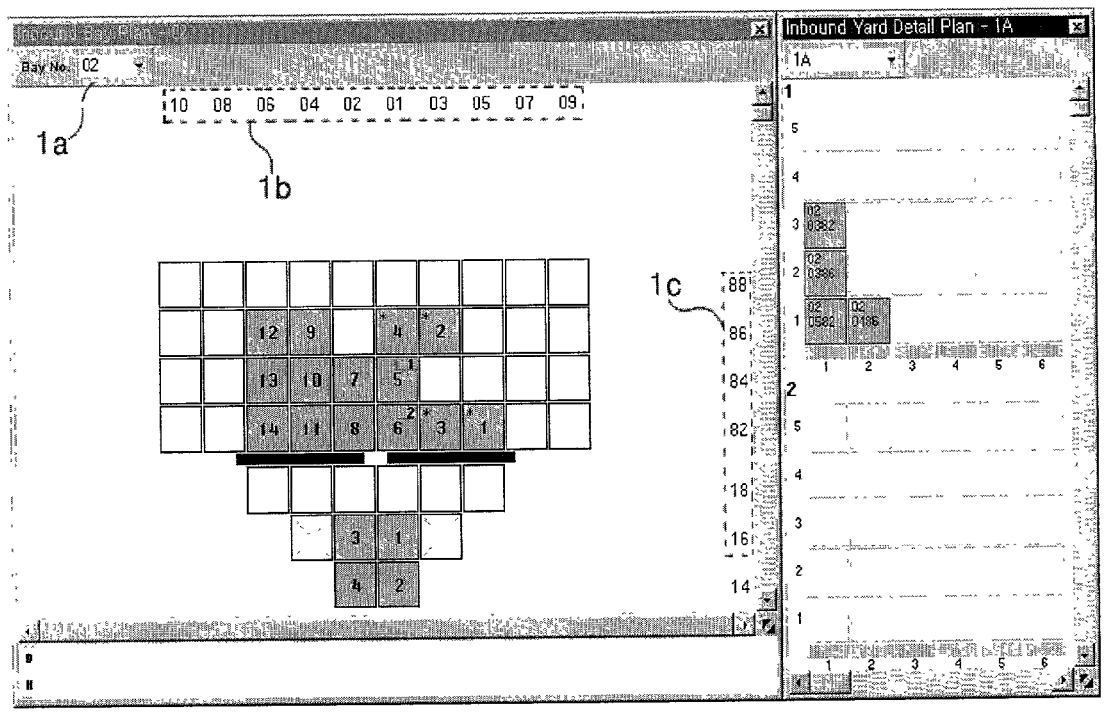
FIG. 5 is a diagram illustrating an unloading schedule and assigning the unloading site.

For more detailed explaining with referred to FIG. 5, the numbers shown at the center cell of the inbound bay plan diagram presents the instruction of the work sequence for unloading the containers. In FIG. 5-1$a$, the number "02" represents the bay number, 1$b$ number (10, 08, 06, 04, 02, 01, 03, 05, 07, 09) represents the row number, and 1$c$ number (88, 86, 84, 82, 18, 16, 14, . . . ) represents the tier number. The numbers displayed at the upper right corner represents the sequence of selected containers for inbound yard planning. The asterisks (*) at leftward of the cell represents the containers of inbound yard planning.

The CPU (50) processes the information of unloading scheduling via the Yard information Database (45) for display detail unloading plan on the screen of the Image Output Unit (30). The displayed schedule instructs the sequence of unloading procedure and the types of equipment for unloading operation. The displayed detail unloading schedule information is able to download from the administrator. (S209)

The Central Processing Unit (50) outputs "Sequence List" for assigning a work sequence number to each gantry crane according to the selected equipment for operation and the sequence work of unloading by the administrator.

A portion of inbound planning program of Program 1 is shown as follows:

PROGRAM 1

```
Public Sub Plan_Ship_IB01(ByVal iBay As Integer, _
                         ByVal row_s As Integer, ByVal row_f As Integer, _
                         ByVal tier_s As Integer, ByVal tier_f As Integer)
    On Error GoTo Error_Display
    Dim a%, i%, j%, k%
    Dim i10%, bOkay%
    Dim cShipDrag     As clsShipDrag
    Dim mcDrag        As New Collection
    a = iBay: iIO = I
    GoSub sub_Config_Drag
    GoSub sub_Config_Ship01
sub_End:
    Set mcDrag = Nothing: Exit Sub
sub_Config_Ship01:
    For Each cShipDrag In mcDrag
        Call cShipDrag.Get_BRT (a, j, k)
        Call mcShip_01.Add(cShipDrag.cShipDrag.sKey)
        pShipCell(iIO, a, j, k).selneq = mcShip01.Count
        Call pcShipCell.Draw_Ship_Cell_SEQ(iIO, a, j, k, True)
    Next
    Return
sub_Config_Drag:
    a = iBay: vcheck.List1.Clear
    For j = row_s To row_f
        For k = tier_s To tier_f
            If Bay(a).cpo(j, k) > 0 Then
                With pShipCell(iIO, a, j, k)
                    bOkay = False
```

PROGRAM 1 -continued

```
                If .rst < > 3 And .seq > 0 And .yLink = False And .selseq = 0 Then bOkay = True
                If bOkay Then
                    vcheck.List1.AddItem Format(.seq. "0000")
                    vcheck.List2.ItemData(vcheck.List1.NewIndex) = IBRT2Long(a, j, k)
                End If
            End With
        End If
    Next
    Next
    With vcheck.List1
        For i = 1 To .ListCount
            Call Long2BRT(.ItemData(i − 1), a, j, k)
            Set cShipDrag = New clsShipDrag
                Call cShipDrag.Set_BRT(a, j, k)
                Call mcDrag.Add(cShipDrag, cShipDrag.sKey)
            Set cShipDrag = Nothing
        Next
    End With
    If mcDrag.Count = 0 Then GoSub sub_End
Return
Error_Display:
    MsgBox "Error " & Err.Number & " occured at [mdlSEQ_Plan_Ship_IB01] " & vbcrif & Err.Description, 16
    Resume Next
End Sub
```

In case of assigning the sequence work of container, a portion of program representing the sequence work of Program 2 is shown as follows:

PROGRAM 2

```
sub_Draw.SEQ:
    If iZM >= 4 Then
        '//Working Sequence
        If iport < > −1 Then
            If .rst = 1 Then
                objTo.Line (x_s_in, y_s_in)-(x_f_in, y_s_in + 19). BORDER_COLOR, BF
            Else
                objTo.Line (x_s_in, y_s_in)-(x_f_in, y_s_in + 19), pcode(iport).pcb, BF
            End If
            If .seq > 0 Then
                objTo.FontBold = False
                objTo.ForeColor = pcode(iport).pcf
                If iIO = 1 Then
                    Select Case pIBPlanMode
                        Case ic_IBTIME
                            objTo.FontName = "CASPExtrasmall"
                            If (.Break_Mtime + .Break_STime) > 0 Or (.Process_MTime + .Process_STime) > 0 Then
                                sItem = Format((.Break_MTime + .Process_MTime) + (.Break_STime + .Process_STime) \6, "@@")
                                sItem = sItem & ":" & Format(((.Break_STime + .Process_STime) Mod 6) * 10, "@@")
                                Call TextOut(objTo.hdc, x_s_in + (x_f − x_s − objTo.TextWidth(sItem)) \2, y_s_in + 11, sItem,
Len(sItem))
                            End If
                        Case Else
                            objTo.FontName = "JRCLarge"
                            sItem = Format(.seq, "###")
                            Call TextOut(objTo.hdc, x_s_in + (x_f − x_s − objTo.TextWidth(sItem)) \ 2, y_s_in + 7, sItem,
Len(sItem))
                    End Select
                Else
```

The Central Processing Unit (50) processes to assign the storing blocks where unloaded containers would be stored based on the detailed unloading schedule information being downloaded from the administrator. (S211) Hereinafter, the CPU (50) processes to unload the containers on the Yard Trailer to transport the container to the storage site, and stocked the container in the storage yard. The unloading schedule information is stored and maintained in the unloading container information Database (S215).

When a Bay plan is transmitted from the shipping company and loading container information is received from the administrator, the CPU (50) starts to scan the Yard Information Database (45) for assigning an available loading site. When the exporting containers arrive at the assigned loading site, the receiving container information will verify for preparing the unloading equipments. The location information is retrieved for reporting a receiving conformation. Then, the cargoes unloads at the loading site, and check out the containers. After completing the unloading, the loading process of subroutine executes to store and maintain the loading container information (S300).

Figure 4:
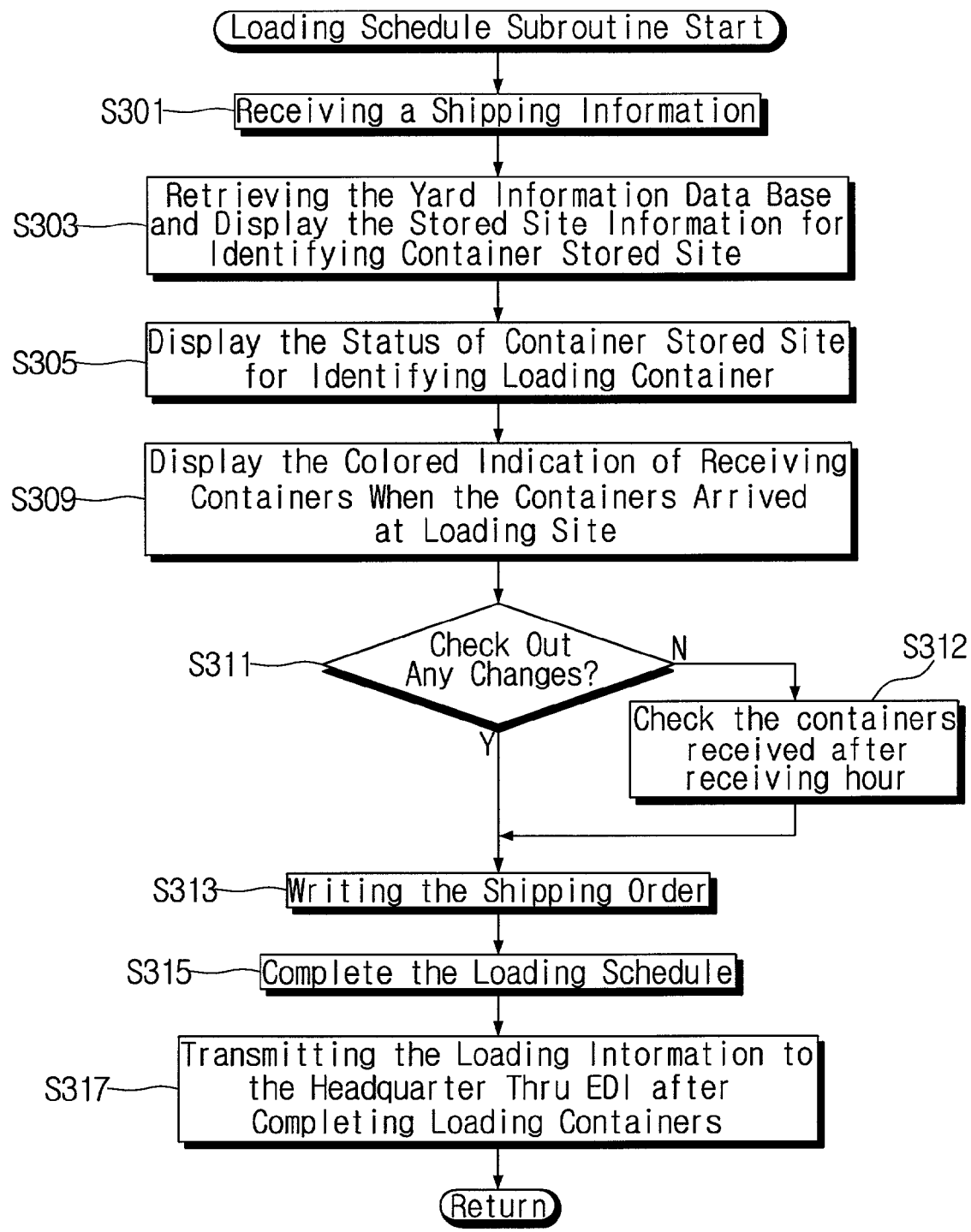
FIG. 4 is a sub-routine illustrating a detailed loading schedule.

The Central Processing Unit (50) executes a container loading scheduling subroutine (S300) as illustrated in FIG. 4. The administrator will transmit the container loading scheduling information. (S301)

Thereafter, the Central Processing Unit (50) processes to search assigned loading site from the Yard Information Database (45). Then, the scanned data displays on the monitor (31) screen through the Image Output Unit (30). (S303)

Figure 8:
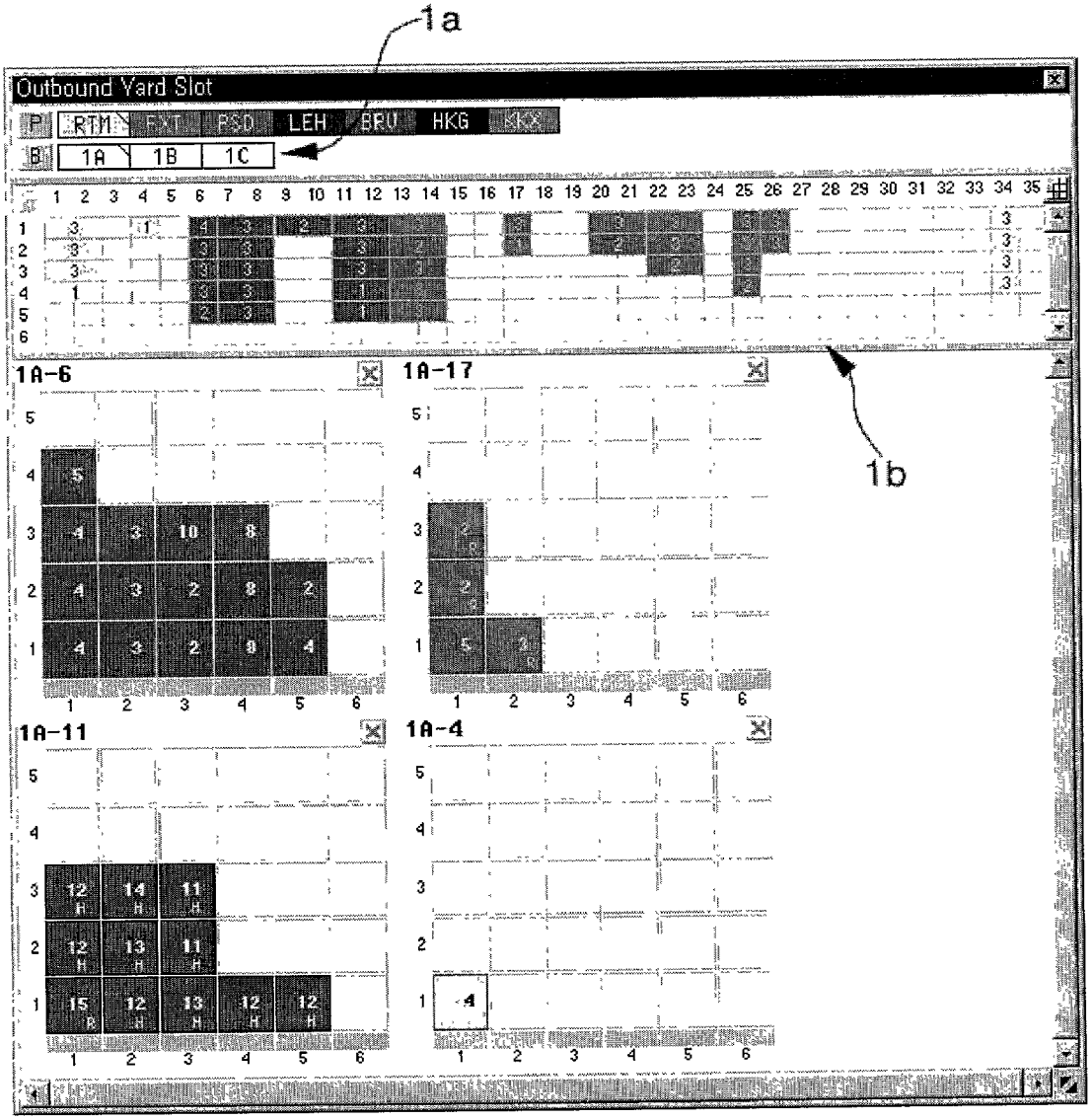
FIG. 8 is a diagram showing a yard storage status of outbound container.

On the other hand, the Central Processing Unit (50) executes the Image Output Unit (30) to display the status of loading site on the screen for exporting containers being loaded on the ship (S305) (Refer FIG. 8).

As illustrated in FIG. 8, the loading information of outbound containers is described on a exemplary diagram being displayed on the monitor screen: "P" represents deploy of POD loading containers, "RTM" represents the yard blocks where the containers are stocked as shown in FIG. 8-1a "1A", "1B", "1C", and FIG. 8-1a represents a top view of "1A" block.

When the administrator clicks the "top view" among the "1A" blocks of bays, the container information, "1A-6", "1A-17", "1A-11", "1A-4" as shown in FIG. 8-1b is displayed on the screen. Each block of bays is able to load 20 feet, 40 feet long container. In order to display the 3 dimensional containers on the 2 dimensional screen, each container of 20 feet or 40 feet long containers is displayed by using double borderline with different colors. However, the display means of the present invention is not limited to this arrangement.

When a signal indicating an arrival of exporting containers is transmitted from the administrator to the Information Input Unit (10), the CPU processes the received signal for unloading the received containers at the assigned loading site. An output of unloading location information displays on the screen with a certain color (for example, red color). (S309)

The Central Processing Unit (50) executes to determine whether there are any changes made in the loading list being transmitted from the administrator or shipping company (S311). If there are any changes made in the loading list, the containers being received after the receiving time are checked. If there are no changes made in the loading list, the Central Processing Unit (50) will issue a shipping instruction as shown in FIG. 7 (S313).

Figure 7:
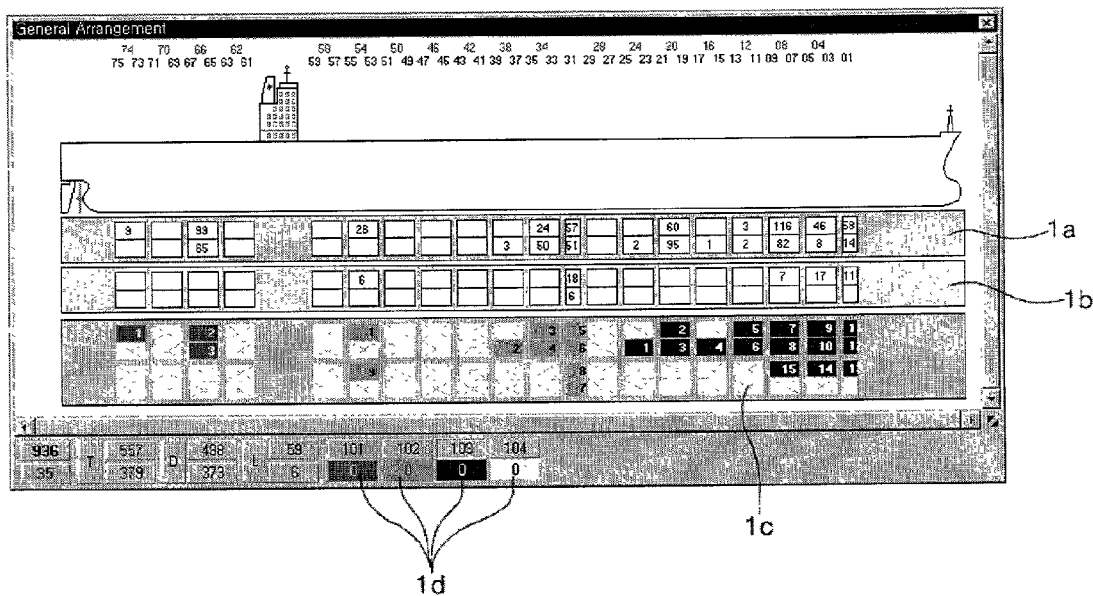
FIG. 7 is a diagram for assigning the available crane based on the amount of loading and unloading cargo and each hatch section.

A diagram as shown in FIG. 7 illustrates the amount of containers for loading and unloading and assigned amount of crane works per each Hatch. Based on the bay plan and shipping instruction transmitted by the shipping company through EDI, the unloading information, FIG. 7-1a and the loading information, FIG. 7-1b are displayed to assign the available Gantry cranes for operating the certain amount of loading and unloading containers of hold deck in the Hatch.

As illustrated in FIG. 5, a number of gantry cranes are assigned to handle the proper amount of loading and unloading containers for each of the hold deck and each of the Hatches. The loading schedule is displayed on the screen for performing the sequence work order by specific "hold deck" per each hatch.

FIG. 7-1c represents no assignment of gantry crane because there is no cargo. At the bottom of FIG. 7, "939" represents the total volume of cargoes, and "35" represents the assigned amount of loading and unloading containers for a specific crane at Hatch. "T" represents the total volume of containers, "D" represents the unloading containers, "L" represents loading containers, and FIG. 7-1d represents each of assigned cranes.

Figure 6:
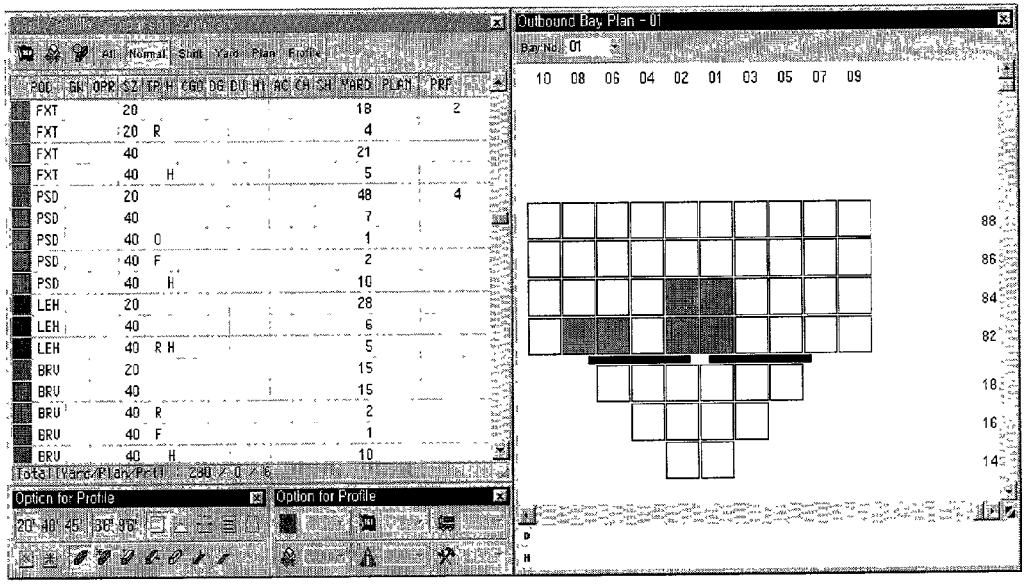
FIG. 6 is a diagram illustrating an issuing of yard container summary and shipping instruction.

In case that a shipping instruction is transmitted by the facsimile from the shipping company, the outbound bay plan, as illustrated at the rightward of FIG. 6, is being transmitted by the administrator through the Information Input Unit (10). As shown in FIG. 7-1b, a shipping instruction will be issued based on the loading information through the Information Input Unit (10).

Once the Central Processing Unit (50) receives the selected quay location information from the administrator, the CPU will process to determine the work order and sequence for issuing the sequence work lists according to the assigned quay location information. (S315)

Then, the Central Processing Unit (50) transmits an instruction signal so that the cargo ship could moor at the designated quay position. After loading completed on the subjected cargo ship, the current loading information of the ship is transmitted to the shipping company through EDI. (S317)

After completing the above processes, the Central Processing Unit (50) stores and maintains the container loading data in the Container Information Database (44). (S319)

Finally, the Central Processing Unit (50) provides the bay plan including the location of ship and lists of loaded containers based on the performance of loading and unloading. (S400)

Figure 9:
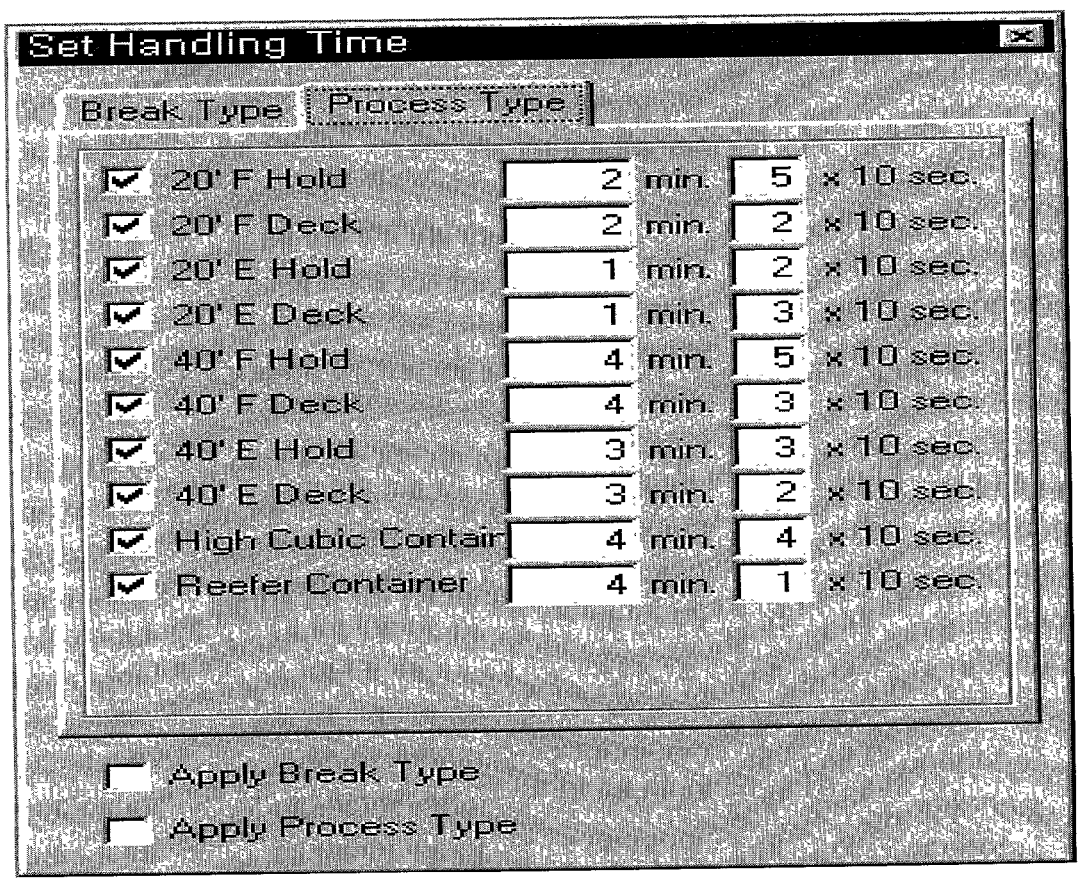
FIG. 9 is a diagram that enables to assign an operating time based on the sorts of containers and container stored locations.

The diagram shown in FIG. 9 enables to establish the operating time of the gantry cranes, and displays the yard equipments for operating the loading or unloading containers at the terminal. It provides the essential information to avoid collision or interference of cranes. After setting the operating time unit by considering the loading location and type of containers, each cell operating time is able to set by selectively pressing the button of "Apply Process Type" and "Apply Break Type" and schedule the sequence work for the crane. The sequential operation of each crane can be generated based on the information of each cell operating time.

The "Break type" includes "boom up", "hatch cover open", "close", and "bay change."

Figure 12:
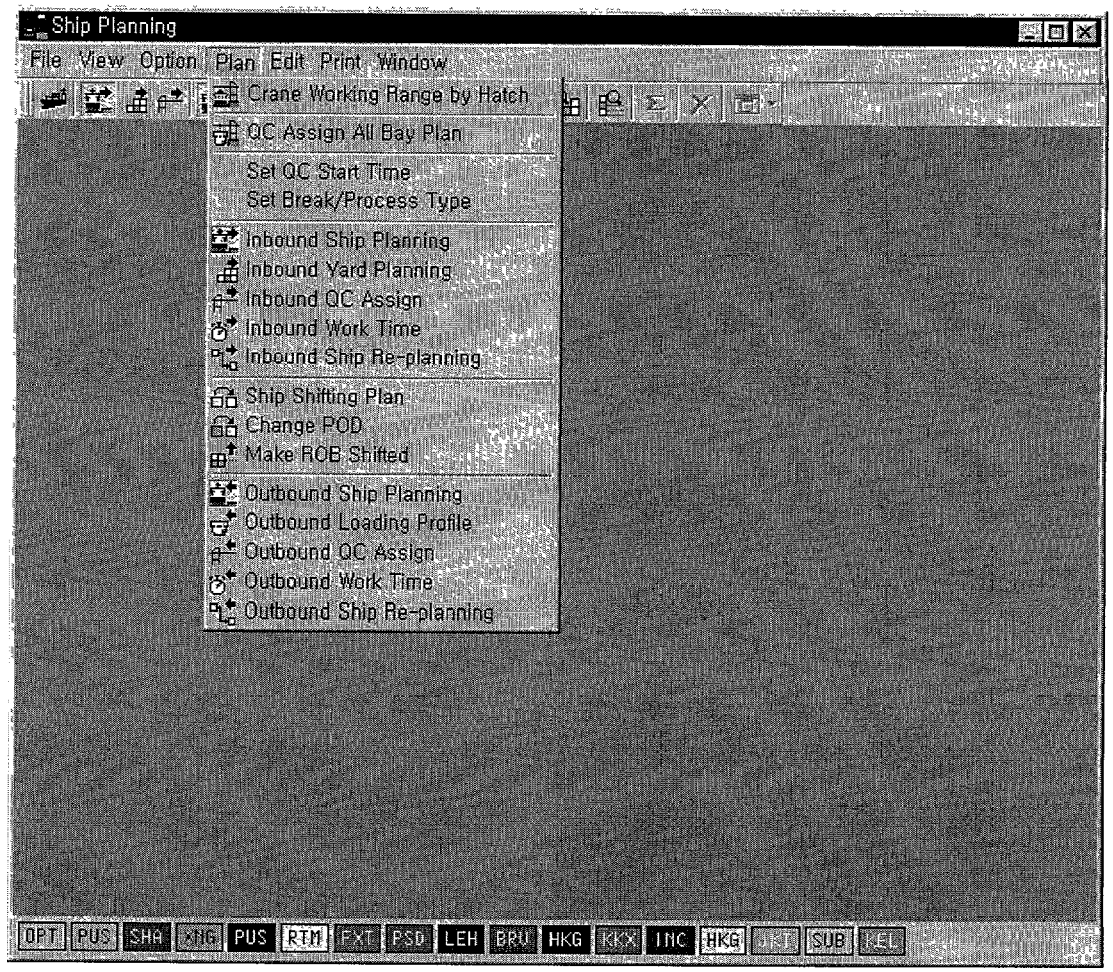
FIG. 12 is a diagram illustrating a detailed menu of ship planning mode.

As illustrated in FIG. 12, if the detailed menu of "Crane Working Range by Hatch" is selected, a screen as shown in FIG. 7 is displayed. If a 2nd menu "QC Assign All Bay Plan" is selected by the administrator, the assigned QC is able to assign the cell unit at once.

As shown in FIG. 12, the detailed menu of "Set QC Start Time" and "Set Break/Process Type" are same as explained in FIG. 9.

Inbound planning mode comprises "Inbound Ship Planning" for assigning sequence, "Inbound Yard Planning" for scheduling unloading containers at the yards, and "Inbound Ship Re-planning" for assigning QCs to each cell.

The loading mode is similar to the "inbound". But the difference is that it includes a planning mode to transfer to "Ship Shifting Plan". "Change POD" can be used if change of POD is needed for the unloaded containers. "Make ROB Shifted" is used for changing the remained containers on board to shift the containers. The optimal shipping service of loading and unloading the cargoes could be achieved by scheduling in advance and considering the locations of the ships and container yards.

As discussed so far, the present invention has an effect to manage the loading and unloading containers efficiently by adapting a scheduling program being applied the bay plan being made from CATOS, an advanced management system of container terminal to the CASP, container loading and unloading planning system.

While the present invention has been described in detail with its preferred embodiments, it will be understood that it further modifications are possible. The present application is therefore intended to cover any variations, uses or adaptations of the invention following the general principles thereof, and includes such departures from the present disclosure as come within known or customary practice in the art to which this invention pertains within the limits of the appended claims.

What is claimed is:

1. A scheduling method for loading and unloading containers at a terminal, the method comprising steps of:
    establishing a yard information database by acquiring ship quay location data, container storage site data and a bay plan, wherein the bay plan includes information of specific cargo shipping position (S100),
    establishing a container database including container loading-unloading schedules, container inventory remaining on a ship, and while loading-unloading containers, inputting outer source container loading-unloading schedule into said container database (S102),
    setting shipping schedules, to facilitate efficient unloading and shipping operations, by establishing a shipping order database according to input from said container database, said bay plan, tidal information and a navigation schedule (S104),
    unloading cargo from one of stand-by container ships by (S200):
        retrieving said yard information database,
        receiving input data of port entering from said outer source,
        assigning an available quay location in response to said input data,
        identifying containers to be unloaded by means of said container database, and
        assigning an available container storage site based on the yard information database,
    loading cargo to one of stand-by container ships by (S300):
        retrieving said yard information database,
        receiving input data of shipping order from said outer source, and
        identifying containers to be loaded by means of said container database,
        location of a container storage site, a cargo destination and a ship quay location, and
    storing and maintaining, based on the unloading (S200) and loading (S300) steps, the bay plan including information of loaded or unloaded containers, location of the container storage site, the cargo destinations and the ship quay location (S400).

2. A scheduling method for loading-unloading containers as claimed in claim 1, wherein said information includes container identification number, indicating destination, shipping cell position, gateway, initial loading port code, loading pod code, unloading port code, selection of unloading port code, final unloading port code, final unloading destination port code, and before/after altered unloading port information for the containers remained on the ship.

3. A computer readable medium containing a computer programming of scheduling method for loading and unloading containers at a container terminal, the medium comprising:
    means for establishing a yard information database by acquiring ship quay location data, container storage site data and a bay plan, wherein the bay plan includes information of specific cargo shipping position,
    means for establishing a container database including container loading-unloading schedules, container inventory remaining on a ship, and while loading-unloading containers, inputting outer source container loading-unloading schedule into said container database,
    means for setting shipping schedules, to facilitate efficient unloading and shipping operations, by establishing a shipping order database according to input from said container database, said bay plan, tidal information and a navigation schedule,
    means for unloading cargo from one of stand-by container ships by retrieving said yard information database, receiving input data of port entering from said outer source, assigning an available quay location in response to said input data, identifying containers to be unloaded by means of said container database, assigning an available container storage site based on the yard information database,
    means for loading cargo to one of stand-by container ships by retrieving said yard information database, receiving input data of shipping order from said outer source, identifying containers to be loaded by means of said container database, location of a container storage site, a cargo destination and a ship quay location, and
    means for storing and maintaining, based on the unloading-loading steps, said bay plan including information of loaded or unloaded containers, location of the container storage site, the cargo destinations and the ship quay location.

* * * * *